(12) United States Patent
Vidal et al.

(10) Patent No.: US 10,714,918 B2
(45) Date of Patent: Jul. 14, 2020

(54) COMPACT ELECTRICAL JUNCTION BOX CONNECTOR SYSTEM

(71) Applicant: GREEN CREATIVE, LTD, Hong Kong (CN)

(72) Inventors: Guillaume Vidal, Mende (FR); Zhang Yulin, Shanghai (CN)

(73) Assignee: Green Creative Ltd., Hong Kong (CN)

( * ) Notice: Subject to any disclaimer, the term of this patent is extended or adjusted under 35 U.S.C. 154(b) by 0 days.

(21) Appl. No.: 15/999,942

(22) Filed: Aug. 31, 2018

(65) Prior Publication Data
US 2019/0074675 A1    Mar. 7, 2019

Related U.S. Application Data

(60) Provisional application No. 62/605,905, filed on Sep. 1, 2017.

(51) Int. Cl.
| | |
|---|---|
| *H02G 3/06* | (2006.01) |
| *H02G 3/16* | (2006.01) |
| *H01R 13/621* | (2006.01) |
| *H01R 13/625* | (2006.01) |
| *H01R 24/00* | (2011.01) |
| *H02G 3/04* | (2006.01) |

(52) U.S. Cl.
CPC ......... *H02G 3/0625* (2013.01); *H01R 13/621* (2013.01); *H01R 13/625* (2013.01); *H01R 24/005* (2013.01); *H02G 3/16* (2013.01); *H02G 3/0468* (2013.01); *H02G 3/0616* (2013.01)

(58) Field of Classification Search
CPC .. H01R 13/621; H01R 13/625; H01R 24/005; H02G 3/0625; H02G 3/16; H02G 3/0616; H02G 3/0468
See application file for complete search history.

(56) References Cited

U.S. PATENT DOCUMENTS

| | | | | |
|---|---|---|---|---|
| 2,962,688 A | * | 11/1960 | Werner | H01R 13/5219 439/320 |
| 3,673,546 A | * | 6/1972 | Green | H01R 24/542 439/172 |
| 4,255,007 A | * | 3/1981 | Michaels | H01R 23/26 439/295 |
| 4,550,967 A | * | 11/1985 | Riches | H01R 13/6278 439/332 |
| 5,514,001 A | * | 5/1996 | Szegda | H01R 13/193 439/259 |
| 6,705,884 B1 | * | 3/2004 | McCarthy | H01R 4/5033 439/394 |
| 6,955,563 B1 | * | 10/2005 | Croan | H01R 13/6272 439/578 |

\* cited by examiner

*Primary Examiner* — Briggitte R. Hammond
(74) *Attorney, Agent, or Firm* — James A. Gavney, Jr.; JAG Patent Services

(57) ABSTRACT

A junction box connector system includes conduit connectors with hollow bodies that secure to pieces conduit and to each other to from a connector cavity. The junction box connector system also includes an interconnect member with interconnect conductors and electrical contacts that fit within the connector cavity and provide electrical conductivity between the sets of wires from the pieces of conduit.

6 Claims, 1 Drawing Sheet

COMPACT ELECTRICAL JUNCTION BOX CONNECTOR SYSTEM

RELATED APPLICATION

This application claims priority under 35 U.S.C. § 119(e) from the U.S. provisional patent application Ser. No. 62/605,905, filed on Sep. 1, 2017, and titled "COMPACT ELECTRICAL JUNCTION BOX CONNECTOR SYSTEM." The U.S. provisional patent application Ser. No. 62/605,905, filed on Sep. 1, 2017, and titled "COMPACT ELECTRICAL JUNCTION BOX CONNECTOR SYSTEM" is hereby incorporated by reference.

FIELD OF THE INVENTION

This invention relates to electrical junction box connector systems. More particularly, the present invention relates to a compact electrical junction box connector systems.

BACKGROUND OF THE INVENTION

Metal or plastic electrical junction boxes generally form a part of an electrical conduit or thermoplastic-sheathed cable (TPS) wiring system in a building. Electrical junction boxes can be designed for surface mounting and are used for mounting to ceilings, under floors or concealed behind access panels, particularly in residential or commercial buildings.

Some electrical junction boxes include built-in terminals for joining wires and form an integral part of a circuit protection system where circuit integrity has to be provided, for example, emergency lighting or emergency power lines.

Regardless of the type or function, electrical junction boxes provide connection points that allow residential or commercial wiring to be service and/or modified.

SUMMARY OF INVENTION

The present invention is directed to a junction box connector system. The junction box connector system includes conduit connectors with hollow bodies that are usually tubular in shape. The conduit connectors have conduit ends for securing to pieces conduit with sets of wires therein and connector ends for securing to each other to from a connector cavity. The junction box connector system also includes an interconnect member with interconnect conductors that pass through the interconnect member and that are insulated by a body portion of the interconnect member. In operation the interconnect member fits within connector cavity and electrically couples to the sets of wires from the two pieces of conduit to provide electrical conductivity between the sets of wires and through the interconnect conductors. The conduit ends of the conduit connectors can be secured to the two pieces of conduit through threaded seating screws and the connector ends of the conduit connectors can be secured together through male/female connector ends. The interconnect member electrically couples to the sets of wires from the pieces of conduit through electrical contacts on the interconnect member within the interconnect member, electrical contacts one or more of the conduit connectors or any combination thereof.

Preferably, the conduit connectors are secured together by a screw post that protrudes from the male-shaped connector end and that fits into a track feature on the female-shaped connector end and the sets of wires from the pieces of conduit are connected to the interconnect member through quick-connect feed compression contacts within housed within the body of the interconnect member.

DETAILED DESCRIPTION

Figure 1:
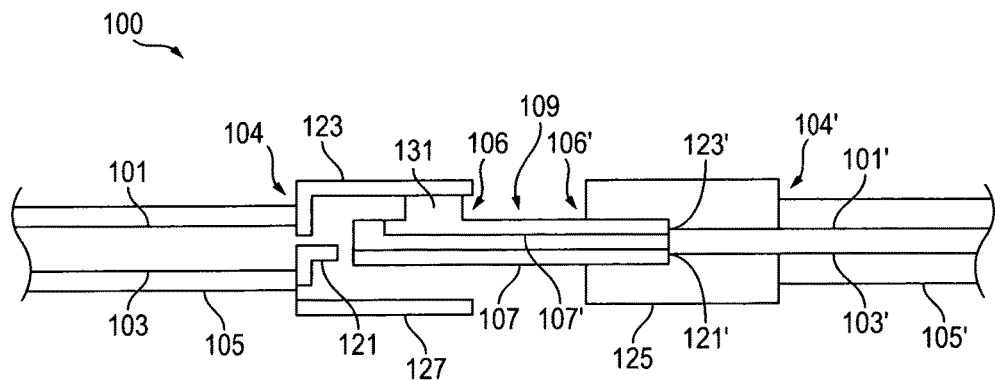
FIG. 1 shows a schematic view of a compact electrical junction box connector system, in accordance with the embodiments of the invention.

FIG. 1 shows a schematic view of a compact electrical junction box connector system 100, in accordance with the embodiments of the invention. The system includes a interconnect member or interconnect insert 109, referred to hereafter as an interconnect member. The interconnect member 109 includes interconnect conductors 107 and 107 that pass through the interconnect member 109 and are at least partially insulated within a body portion of the interconnect member 109. The body portion of the interconnect member 109 is made of a polymeric material, such as plastic, rubber or any other suitably insulating material or combination of insulating materials.

The compact electrical junction box connector system 100 has two conduit end connectors 123 and 125, hereafter conduit connectors, that are configured to couple to pieces of conduit 105 and 105', respectively. The conduit connectors 123 and 125 are generally tubular in shape and substantially hollow. The conduit connectors 123 and 125 are made of metal, a polymeric materials or a combination thereof. Interior surface of the conduit connectors 123 and 125 can be coated with insulating material and/or have insulator inserts positioned therein. Insulator inserts can, for example be a formed from a fiber material, such a cardboard, plastic or any other suitable insulating material. The conduit connectors 123 and 125 have conduit ends 104 and 104' for securing to pieces conduit and connector ends 106 and 106' for securing to each other to from a connector cavity for securing and holding the interconnect member 109. The conduit ends 104 and 104' of the conduit connectors 123 and 125 can be secured to the pieces of conduit 105 and 105' by any suitable means including, but not limited to, threaded features, snaps, glue, screws and clamps. The connector ends 106 and 106' of the conduit connectors 123 and 125 can be coupled together from a connector cavity by any suitable means including, but not limited to, threaded features, snaps, glue, screws and clamps. The conduit ends 104 and 104' of the conduit connectors 123 and 125 are preferably attached to the pieces of conduit 105 and 105' by through threaded set screws, such as describe below, and the connector ends 106 and 106' of the conduit connectors 123 and 125 are preferably attached together through fitted male and female structures, also described below.

The pieces of conduit 105 and 105' are made or plastic or metal and are preferably a flexible, but can also be rigid or semi-rigid. Within the pieces of conduit 105 and 105' there are sets of insulated electrical wires 101/103 and 101'/103' that provide electrical conductivity from a power source (not shown) to a power outlet or an electrical appliance or device (not shown).

With the system 300 (FIG. 3) assembled, the sets of electrical wires 101/103 and 101'/103' are electrically connected through electrical contacts 121/123 and 121'/123' and through interconnect conductors 107 and 107' of the interconnect member 109. The electrical contacts 121/123 and 121'/123' are compression contacts, quick snap contacts or any other suitable electrical contacts. Electrical contacts on the conduit connectors 123 and 125 are referred to herein as connector contacts and contacts on the interconnect member 109 are referred to as interconnect contacts. It will be clear to one skilled in the art that the sets of insulated electrical wires 101/103 and 101'/103' can be electrically couple to any combination connector contacts and interconnect contacts to provide electrical conductivity between the sets of electrical wires 101/103 and 101'/103' through the interconnect conductors 107 and 107.

In accordance with an embodiment of the invention the contacts 121, 121' and 123 are longitudinal contacts that align with and are substantially parallel with the wires 103, 103' and 101', while the contact 107' has a radially positioned protruding structure 131 that electrically couples to the contact 123 in a perpendicular direction with respect to the wire 101. This configuration allows the conduit connector 127, and/or the interconnect member 109 along with the conduit connector 125 to be rotated while maintaining electrical connectivity between the wires 101/101' and 103/103'.

Figure 2:
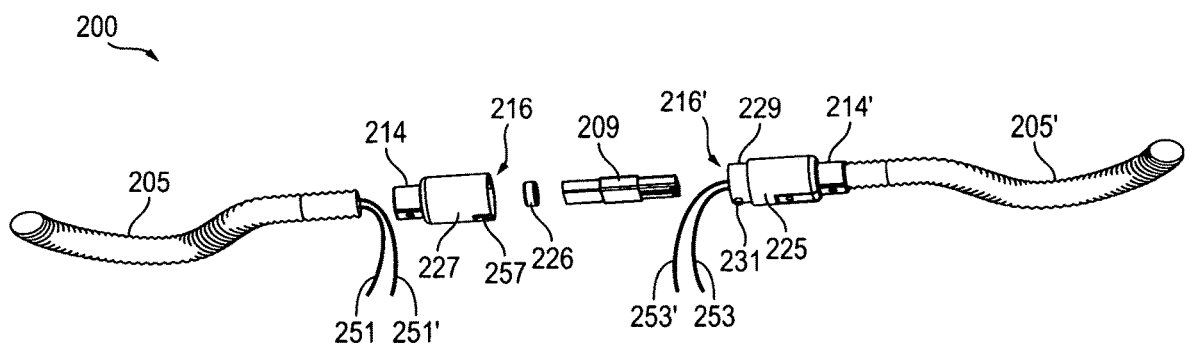
FIG. 2 shows an exploded view of a compact electrical junction box connector system, in accordance with the embodiments of the invention.

FIG. 2 shows an exploded view of a compact electrical junction box connector system 200, in accordance with the embodiments of the invention. As described above, the compact electrical junction box connector system 200 includes an interconnect member 209 that is positioned between two conduit connectors 227 and 225. As described above, the conduit connectors 227 and 225 have conduit end 214 and 214' to be secured to the pieces of conduit 205 and 205' and connector ends 216 and 216' to be secured together from a connector cavity by any suitable means. Preferably the connector end 216' of the conduit connector 225 has a male portion 229 that fits into the connector end 216 of the conduit connector 227 and is secured to the conduit connector 227 through a screw post 231 that fits into a track feature 257.

The interconnect member 209 provides electrical connectivity between sets of wires 251/251' and 253/253' insulated within pieces of conduit 205 and 205'. The sets of wires 251/251' and 253/253' also pass through portions of the conduit connectors 227 and 225 to engage the interconnect member 209. In accordance with the embodiments of the invention the interconnect member 209 includes quick connect contacts, wherein striped end portions of the sets of wires 251/251' and 253/253' are pushed into wire feed apertures at each end of the interconnect member 209 and secured therein by feed compression contacts housed within the body of the interconnect member 209. The compact electrical junction box connector system 200 also preferable includes a compression washer 226. The compression washer 226 is made from a rubber material, silicon, or plastic materials and provides a compression seal between the conduit connectors 227 and 225, when the conduit connectors 227 and 225 are fitted together by placing a male portion 229 of the conduit connector 225 within the conduit connector 227 with sets of wires connected to the interconnect 209 and the interconnect member 209 positioned between the conduit connectors 227 and 225, such as described above. The compression washer 226 can help secure the connection between conduit connectors 227 and 225, secure the interconnect member 209 within the connector cavity or a combination thereof. For example, the compression washer 226 can fit securely around the interconnect member 209 and/or provide and outward force to a post screw 331 within a track feature 357 (FIG. 3) such as described below.

Figure 3:
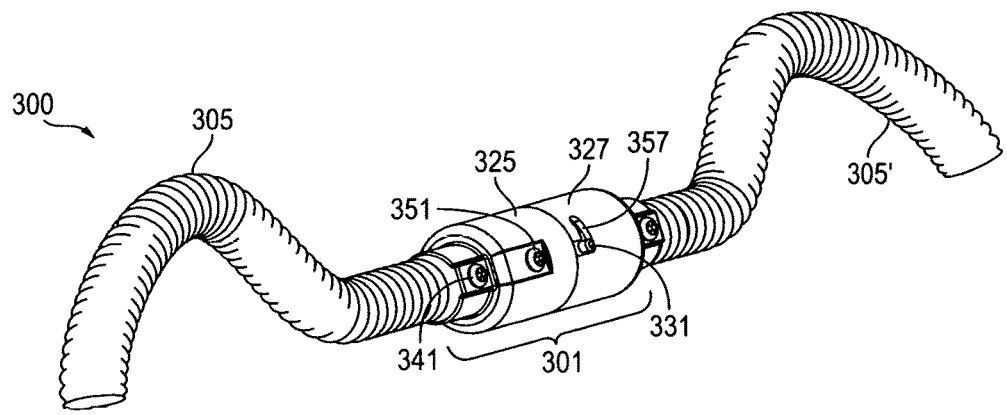
FIG. 3 shows a view of an assembled compact electrical junction box connector system, in accordance with the embodiments of the invention.

FIG. 3 shows a view of an assembled compact electrical junction box connector system 300, in accordance with the embodiments of the invention. As described above, the compact electrical junction box connector system 300 includes a connector system 301 with conduit connectors 325 and 327, with an interconnect 209 (FIG. 2) housed therein. The conduit connectors 325 and 327 have conduit end portions that hold and secure pieces of conduit 305 and 305'. In operation the pieces of conduit 305 and 305' are secured into the conduit end portions of the conduit connectors 325 and 327 through threaded seating screws 341 and 341' that are turn to engage portions of the pieces of conduit 305 and 305' after they are inserted or fitted into the conduit end portions of the conduit connectors 325 and 327, respectively. Connector end portions of the conduit connectors 325 and 327 can also be secured together through a threaded seating screw 351 that is thread through the conduit connector 325 and is turned to engage the male portion 229 (FIG. 2) of the conduit connector 327. Alternatively, or in addition to the seating screw 351 the connector system 301 further includes a screw post 331 on the male end portion 229 of the conduit connector 325 that seats or fits into a track feature 357 on the conduit connector 327. In operation, the conduit connectors 325 and 327 are seated together, as described above, and the conduit connectors 325 and 327 are twisted with respect to each other positioning the post screw 331 along the track feature 357. The post screw 331 and/or threaded seating screw 351 are then tightened to lock the conduit connectors 325 and 327 in a closed position as shown in FIG. 3.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A junction box connector system comprising:
   a) two conduit connectors with hollow bodies and conduit ends for securing to two pieces conduit with sets of wire protruding therefrom and connector ends for securing to each other to thereby form a connector cavity; and
   b) an interconnect member with interconnect conductors that pass through the interconnect member and that are insulated by a body portion of the interconnect member, wherein the interconnect member fits within connector cavity for electrically coupling to the sets of wires protruding from the two pieces of conduit to provide electrical conductivity between the sets of wires and through the interconnect conductors, wherein one of the two conduit connectors has a male connector end and one of the conduit connectors has a female connector end, such that the male connector end seats within the female connector end to form the connector cavity and wherein the two conduit connectors are secured together by a screw post that protrudes from the male connector end and fits into a track feature on the female connector end.

2. A junction box connector system comprising:

a) two conduit connectors with hollow bodies and conduit ends for securing to two pieces conduit with sets of wire protruding therefrom and connector ends for securing to each other to thereby form a connector cavity; and b) an interconnect member with interconnect conductors that pass through the interconnect member and that are insulated by a body portion of the interconnect member, wherein the interconnect member fits within connector cavity and for electrically coupling to the sets of wires through quick connect contacts on the interconnect member, wherein end portions of the sets of wires are pushed into each end of the interconnect member to thereby provide electrical conductivity between the sets of wires and through the interconnect conductors wherein one of the two conduit connectors has a male connector end and one of the conduit connectors has a female connector end, such that the male connector end seats within the female connector end to form the connector cavity and wherein the two conduit connectors are secured together by a post that protrudes from the male connector end and fits into a track feature on the female connector end.

3. A junction box connector system comprising:

a) conduit connectors with hollow bodies and conduit ends for securing to pieces conduit with sets of wires protruding therefrom and connector ends for securing to each other to thereby form a connector cavity; and b) an interconnect member with interconnect conductors that pass through the interconnect member that are insulated by a body portion of the interconnect member, wherein the interconnect member fits within connector cavity and electrically couples to the sets of wires through the interconnect conductors to provide electrical conductivity between the sets of wires.

4. The junction box connector system 3, wherein one of the conduit connectors has a male connector end and one of the conduit connectors has a female connector end, wherein the male connector end is seated within the female connector end to form the connector cavity.

5. The junction box connector system 3, further comprising a compression washer provides a compression seal between the conduit connectors when the conduit connectors are fitted together to form the connector cavity.

6. The junction box connector system 4, wherein the two conduit connectors are secured together by a screw post that protrudes from the male connector end and fits into a track feature on the female connector end.

* * * * *